United States Patent [19]
Jacobsen et al.

[11] Patent Number: 5,433,354
[45] Date of Patent: Jul. 18, 1995

[54] SURFACE PORT FOR CRACK FILLING

[76] Inventors: Kenneth H. Jacobsen, 921 N. Quentin Rd., Palatine, Ill. 60067; Louis F. Cole, 672 Constitution Dr., Unit 93-5, Palatine, Ill. 60074

[21] Appl. No.: 154,625

[22] Filed: Nov. 18, 1993

[51] Int. Cl.⁶ ............................................. B65D 5/72
[52] U.S. Cl. ........................................ 222/495; 425/12
[58] Field of Search ............... 222/495, 559; 405/107; 425/12, 13; 156/94; 285/921

[56] References Cited

U.S. PATENT DOCUMENTS

| | | | |
|---|---|---|---|
| 1,530,112 | 3/1925 | Densmore | 222/495 |
| 3,344,963 | 10/1967 | Wynes et al. | 222/495 |
| 4,047,497 | 9/1977 | Grobler | 425/13 |
| 4,961,883 | 10/1990 | Jacino et al. | 425/13 |
| 5,015,014 | 5/1991 | Sweeney | 285/921 |
| 5,018,555 | 5/1991 | Hawerkamp | 285/921 |
| 5,069,836 | 12/1991 | Werner et al. | 425/13 |

Primary Examiner—Andres Kashnikow
Assistant Examiner—Philippe Derakshani
Attorney, Agent, or Firm—Charles F. Lind

[57] ABSTRACT

The surface port device has a tube with a throughbore between its inlet and outlet ends, and an enlarged flat base at the outlet end, suited to be bonded by adhesive securely to a structure surface with the tube bore aligned over a surface crack. The inlet tube end is stepped, having several adjacent generally cylindrical axially extended land areas of progressively smaller diameters I.D. in moving downstream toward the outlet end. The land areas are sized both in diameter and axial length to correspond to certain more common generally cylindrical land areas of conventional available material mixing/dispensing tubes proximate the outlet nozzles thereof. This allows the establishment of a mechanically sound leakproof separable joint between the material dispensing tube end the surface port device. A captive check ball in the tube bore automatically can be shifted between opening the port bore or closing it to preclude material backflow. A cap can cooperate snuggly with the port bore land area for mechanically positive bore port closure, while further unseating the ball check to bleed the port bore beforehand.

18 Claims, 1 Drawing Sheet

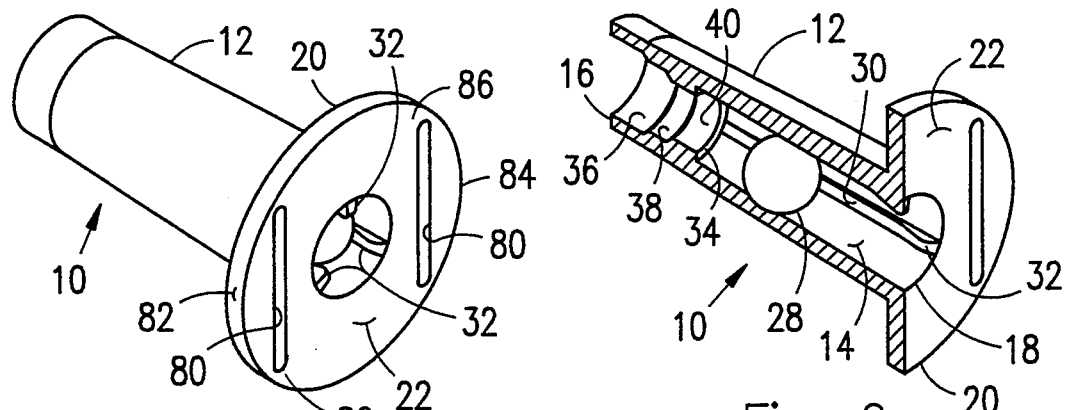
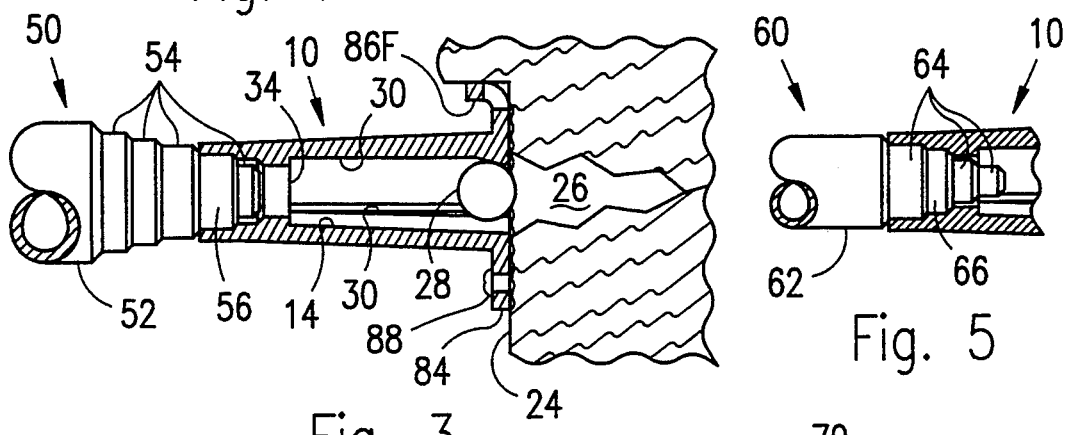
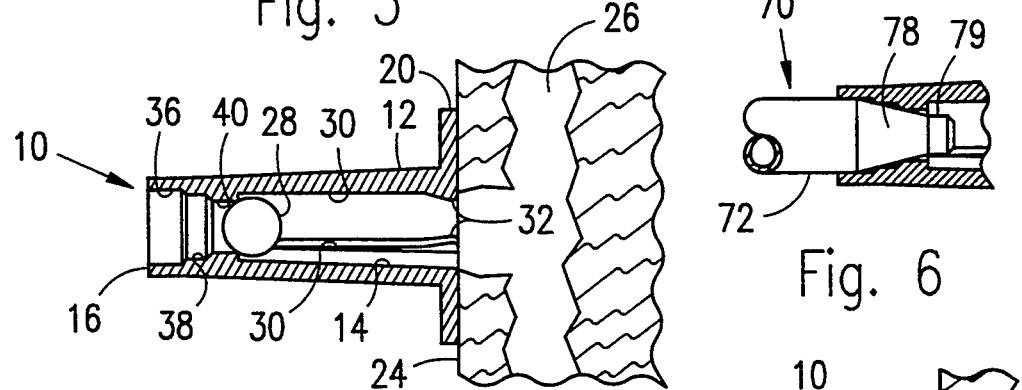
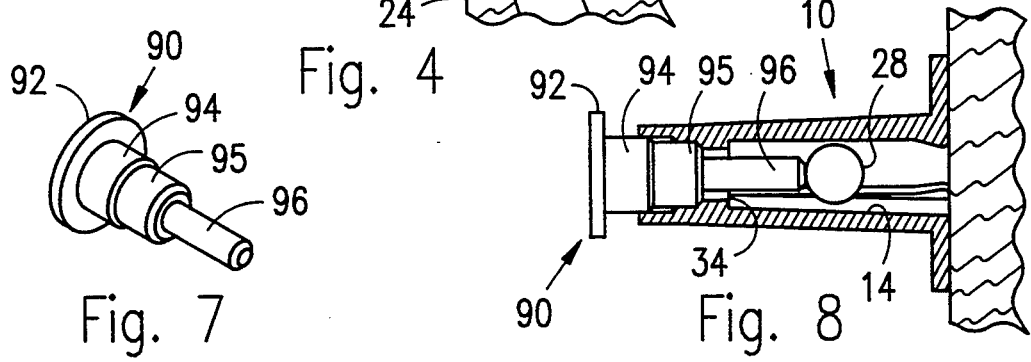

SURFACE PORT FOR CRACK FILLING

FIELD OF THE INVENTION

This invention relates to a surface port device usable for dispensing fluid material (s) via conventional dispensing outlet nozzle(s) directly into a surface crack of a structure, such as concrete floors, walls or ceilings.

BACKGROUND OF THE INVENTION

Caulk, adhesive, potting material and other fluid systems are commonly contained in tubular cartridges of the type having an outlet nozzle at one end and an opposite open end that is closed by a wiper slidably seated against the inside face of the cartridge wall. The material is discharged from the outlet nozzle by advancing the wiper through the cartridge toward the nozzle, which increases the static pressure of the contained material sufficiently to overcome the back pressures against such flow.

Available dispensing tools conventionally utilize a plunger connected to a rod, and a power device activated by a control such as a trigger forces the rod and plunger axially into the open cartridge end and against the wiper. Many dispensing tools are hand held and portable, being powered manually by a ratchet mechanism indexed incrementally upon each trigger squeeze.

Our U.S. Pat. No. 5,263,614 issued on Nov. 23, 1993 from copending patent application having Ser. No. 07/882,836 filed May 14, 1992, discloses manual dispensing tools having spring linkages between the power device and each driven plunger for storing and dissipating unused energy inputted to the power device for maintaining substantially continuous forces on the plunger even between successive trigger squeezes. This overcomes many problems that can occur when an incompressible contained material is being discharged by an incrementally actuated power device.

Our U.S. Pat. No. 5,314,092 issued on May 24, 1994 from patent application having Ser. No. 08/014,114 filed Feb. 5, 1993, discloses a specific dispensing tool plunger having a shiftable O-ring for providing a sealing-venting action to minimize leakage past the wiper and plunger when dicharging the material, while allowing the plunger to be removed from the emptied cartridge for reuse.

Single component fluid systems use only one material cartridge, the material being discharged therefrom via an elongated dispensing tube having the outlet nozzle at its downstream end. Multiple component fluid systems use different material cartridges from which the materials are simultaneously discharged in the precise ratio needed to form the intended composite material, the discharged materials being blended together in an elongated mixing/dispensing tube before being discharged as the composite material via the single outlet nozzle at the downstream end of the mixing/dispensing tube.

Component fluid systems have been successfully used for filling surface cracks in concrete structures to restore structural integrity. Special conduit routing structures can be fitted over the outlet nozzle of the dispensing tube for more accurately directing the discharged material to the intended region of use. One such routing structure is a surface port device, which is in the form of a tube having an enlarged flat base at the outlet end, the base being suited to be bonded by adhesive to the structural surface with the tube bore aligned over a surface crack. The material dispensing tube is then seated against the opposite inlet tube end, to funnel the discharged material via the surface port device directly into the underlying crack.

One major problem that arises is the effort needed for maintaining a nonleaking seated fit between the dispensing tube outlet nozzle and surface port inlet, as reasonably high discharge pressures are common and the user typically must physically hold these seated components together. This is due in part because of the varied types and sizes of commercially available dispensing tubes encountered in every day practical situations.

Specifically, the diameter of the dispensing tubes vary, depending on the material being dispensed, its viscosity and needed rate of mixing and volume of discharge. For example, mixing tubes for multiple component systems typically will be of $\frac{1}{4}$, $\frac{3}{8}$ or $\frac{1}{2}$ inch inner diameter or I.D. and (because of the wall thickness of the tube) a correspondingly larger outer diameter or O.D. and the outlet nozzle end of each such tube might be configured as a three, four or five smaller stepped cylindrical I.D. and O.D. nose section. Dispensing tubes of single component systems and the smaller multiple component mixing tubes might be of $\frac{1}{4}$ inch I.D., and the outlet nozzle end might have a conically tapered nose ending at possibly $\frac{1}{8}$ inch O.D. with a correspondingly smaller I.D.

Surface cracks are commonly fixed by surface working a sealing material into the crack along its length, interrupted at spaced locations where different surface port devices would instead be bonded to the surface over the crack. This effectively closes off the crack along the surface, except at the spaced port devices that serve as inlet or outlets. The adjacent port devices would typically be separated by between several inches and several feet. The dispensed material would then be forced into the crack via the port devices, generally starting at the lowest port device on a vertical wall for example, and filling the crack at that location until the material begins to ooze out any higher port device.

A related problem then arises, that is to stop material oozing from the port by closing the port. This is particularly important when the port is located overhead, as in a ceiling.

Still another problem is the compromise of the size and shape of the port base, to provide sufficient surface-device bonding to withstand the injection pressures while not separating from the surface. The conventional circular base shape provides good symmetry of bonding and retention around a concentrically centered material feed tube, but does limit how close the device can be placed to any nearby structure, such as at an interior corner of angled surfaces.

As most cracks are wider at the surface than the crack width deeper in the structure, the material discharge rate should be slow enough to allow deeper material pentration into the crack rather than just along the surface. Common multiple component materials include two-part epoxies, urethanes, silicones, phenolics, acrylics and polyesters.

SUMMARY OF THE INVENTION

A basic object of this invention is to provide a surface port device that will have great universality, to operate effectively with many different types and sizes of dispensing tubes and outlet nozzles used in dispensing fluid material(s) from tubular cartridge(s), while maintaining a nonleaking seated fit between the dispensing tube outlet nozzle and port device inlet, and possibly even without the need for physically holding these seated components together with any significant force.

A related object of this invention is to provide a surface port device having improved checks to close off the port after the dispensed material begins to back flow through it, one check being operated automatically and another check being operated manually.

Still another object of this invention is to provide a surface port device having an improved base to generate adequate bonding forces to hold the device to the surface during use, while further allowing placement of the device close to nearby interior corner structures or the like.

BRIEF DESCRIPTION OF THE DRAWINGS

These and further objects, advantages and features of the present invention will be understood and appreciated upon reviewing the following disclosure, including as a part thereof the accompanying drawings, in which:

FIG. 1 is a perspective view of an improved surface port device, as seen from the surface mounting base end thereof;

FIG. 2 is a broken away center section perspective view of the improved surface port of FIG. 1, showing additional details of the device;

FIG. 3 is a sectional view of the surface port of FIGS. 1 and 2, secured in place to a surface for filling a crack therein, the section being taken normal to and throught the crack, showing also a dispensing tube operatively cooperating with the device and a check ball in its port open position for crack filling;

FIG. 4 is a sectional view related to FIG. 3, except taking the section along the length of the crack, and showing the surface port without the dispensing tube, and with the check ball in its port closing position;

FIG. 5 and 6 are sectional views of part of the surface port device of the previous figures, except showing it in use with different sizes and types of dispensing tubes;

FIG. 7 is a perspective view of a closure cap for the surface port device of the previous figures, to be used to close the port such as when the filling operation has been completed; and FIG. 8 is a sectional views of part of the surface port device of the previous figures, showing the closure cap secured thereto for closing the port.

DETAILED DESCRIPTION OF A PREFERRED EMBODIMENT

A preferred embodiment of the improved surface port device 10 is illustrated alone in FIGS 1 and 2. The surface port device 10 is in the form of a tube 12 having a throughbore 14 between inlet end 16 and outlet end 18. An enlarged circular base 20 is formed on the tube 12 at the outlet end 18, with a flat end face 22 on the base suited to be bonded by adhesive securely to a structure surface 24 (FIGS. 3 and 4), with the tube bore 14 aligned over a surface crack 26.

A ball 28 is held captive in the tube bore 14, free to move axially along three equally spaced guide rails 30 projected radially into the bore, until stopped by butting against inward projections 32 on the rails adjacent the outlet end 18 and against annular seat 34 upstream therefrom toward the inlet end 16. When the ball 28 is butted against the seat 34 (see FIG. 4), the port will be closed to the extent that backflow of material past the seat toward the inlet end 16 is restricted. At other ball positions in the bore 14, specifically when butted against guide rail projections 32 (see FIG. 3), the bore 14 is open for flow of material in the downstream direction and from the outlet end 18.

The inlet end 16 is stepped in defining the bore 14, having three axially adjacent generally cylindrical axially extended land areas 36, 38 and 40 of progressively smaller inner diameters in moving downstream toward the outlet end 18. The land areas 36, 38 and 40 are sized both in diameter and axial length to correspond to certain of the adjacent generally cylindrical land areas forming the stepped nose section on the outlet nozzles of conventional available mixing or dispensing tubes.

Three specific but typical outlet nozzle configurations of conventional available mixing or dispensing tubes 50, 60 and 70 are respectively illustrated in FIGS. 3, 5 and 6, showing them in operative seating association with the disclosed surface port device 10.

Tube 50 (FIG. 3) is representative of a ½ inch I.D. mixing/dispensing tube available for use in a multiple component fluid system, having a main tube portion 52 of possibly ⅝ inch O.D, and five smaller stepped cylindrical O.D. nose sections identified as 54 generally and as 56 with respect to the second smallest nose section. As illustrated, the second smallest nose section 56 cooperates snuggly with the largest I.D. land area 36 of the surface port device 10, both according to the redial snugness and the axial overlap. This snugged fit establishes a complete leakproof separable joint between the dispensing tube outlet nozzle and the surface port device 10, and does so with a mechanically tight fit between these components effective when firmed together to need a greatly reduced holding force to maintain the fit tight, snug and leakproof.

Tube 60 (FIG. 5) is representative of a ⅜ inch diameter I.D. mixing/dispensing tube available for use in a multiple component fluid system, having a main tube portion 62 of possibly ½ inch O.D, and four smaller stepped cylindrical O.D. nose sections identified as 64 generally and as 66 with respect to the second largest nose section. As illustrated, the second largest nose section 66 cooperates snuggly with the second largest I.D. land area 38 of the surface port device, both according to the radial snugness and the axial overlap. Again, this mechanically snugged separable joint seals the dispensing tube outlet nozzle and surface port device together, and does so without the need of continued significant holding forces between these components. The O.D. nose sections 64 smaller than the seating section 66 fit into the port tube without significant contact with the remaining I.D. land areas of the surface port device 10.

Tube 70 (FIG. 6) is representative of a ¼ inch I.D. mixing/dispensing tube of a multiple component fluid system or of a dispensing tube of a single component fluid system, such as a caulk tube, having a main tube portion 72 of possibly 11/32 inch O.D, and a conically tapered nose section 78 leading to a cylindrical O.D. nose section 79. As illustrated, the main tube portion 72 is seen to cooperate snuggly with the largest I.D. land area 36 of the surface port device 10, both according to the radial snugness and the axial overlap, again to establish a leakproof separable joint between the dispensing tube outlet nozzle and the surface port device. The tapered nose section 78 fits into the port tube without significant contact with the remaining I.D. land areas.

By way of specific example, the land area 36 can be of 0.375 inch I.D. with an axial length of 0.185 inch; the land area 38 can be of 0.25 inch I.D. with an axial length of 0.125; and land area 40 can be of 0.165 inch I.D.

Relative to solving the spacing problem between the device and any nearby structure, such as at an interior corner, the base 20 has parallel slots 80 formed therein, terminating only slightly spaced from the circumferential base edge 82. Opposite base segment sections 84 are thus defined, each connected to the interior base portion by thin webs 86. Either base segment section 84 can be folded up 90 degrees at the webs (see the illustration at 86F in FIG. 3), to allow the device to be positioned closer to any nearby structure, with the slot edge against it. Alternatively, with the segment 84 left flat, adhesive between the surfaces 22 and 24 can be squeezed through the slot to bead over as at 88 the remote base face and thereby increase the holding securement between the port device and surface 24. The slots 80 are spaced radially from the bore 14 sufficiently to maintain the joint between the surfaces 22 and 24 radially of the bore leakproof.

As noted, the ball 28 against the annular seat 34 closes off the port bore 14 to preclude material back flow through it, operating automatically as gravity and/or the backflowing material moves the ball to the seat. In this regard, the ball might preferably be formed of a metal (steel), to add to its weight and use gravity as much as possible, whereby a plastic ball could float in a heavier material and not close. The tube 12 and base 20 otherwise can be formed as a unitary piece of plastic. The ball 28 can be snapped past the somewhat resilient guide rail projections 32 when inserting it into its captive containment within the bore 14.

A cap 90 is also provided, having a gripping flange 92 larger than the port tube O.D. and having three smaller stepped cylindrical O.D. nose sections 94, 95 and 96. As illustrated, the nose O.D. sections 94 and 95 respectively cooperate snuggly with the land areas 36 and 38 of the port device according to the radial snugness for establishing a mechanically snug separable bore closure. The O.D. nose section 96 is sufficiently long and narrow to fit into the port tube without significant contact with the remaining I.D. land area 40, while further unseating the ball 28 from the seat 34 to open the port bore 14 before the cap closes it. This is of benefit to drain liquid from the bore before capping it.

While only a specific embodiment of the invention has been illustrated, it is apparent that variations may be made therefrom without departing from the inventive concept. Accordingly, the invention is to be limited only by the scope of the following claims.

What we claim as our invention is:

1. A port device for funneling material into a surface crack, comprising the combination of
    a tube having a throughbore between its inlet and outlet ends, and a base at the outlet end suited to be bonded by adhesive to the surface with the tube throughbore aligned over the crack therein;
    the tube at the inlet end being stepped, as several adjacent generally cylindrical axially extended inner diameter land areas of progressively smaller diameters in moving downstream toward the outlet end;
    the tube inner diameter land areas being sized both in diameter and axial length to correspond to certain more common generally cylindrical outer diameter land areas of conventional universally available but differently sized material mixing/dispensing tubes proximate the outlet nozzles thereof, operable when at least one and generally only one set of respective inner diameter and outer diameter land areas from the tube and mixing/dispensing tube are snugged together to establish a leakproof separable joint between the mixing/dispensing tube and the port device.

2. A port device according to the combination of claim 1, further comprising the combination of check means operable to be shifted freely between different positions in the tube throughbore for opening the throughbore to material flow or closing it to preclude material backflow.

3. A port device according to the combination of claim 1, further comprising the combination of the largest inner diameter tube land area being substantially 0.375 inch in diameter and having an axial length of substantially 0.185 inch.

4. A port device according to the combination of claim 1, further comprising the combination of the second largest inner diameter tube land area being substantially 0.25 inch in diameter and having an axial length of substantially 0.125 inch.

5. A port device according to the combination of claim 1, further comprising the combination of the third largest inner diameter tube land area being substantially 0.165 inch in diameter.

6. A port device according to the combination of claim 1, further comprising the combination of the largest inner diameter tube land area being substantially 0.375 inch in diameter and having an axial length of substantially 0.185 inch, and the second largest inner diameter tube land area being substantially 0.25 inch in diameter and having an axial length of substantially 0.125 inch.

7. A port device according to the combination of claim 1, further comprising the combination of the largest inner diameter tube land area being substantially 0.375 inch in diameter and having an axial length of substantially 0.185 inch, the second largest inner diameter tube land area being substantially 0.25 inch in diameter and having an axial length of substantially 0.125 inch, and the third largest inner diameter tube land area being substantially 0.165 inch in diameter.

8. A port device for funneling material into a surface crack, comprising the combination of
    a tube having a throughbore between its inlet and outlet ends, and a base at the outlet end suited to be bonded by adhesive to the surface with the tube bore aligned over the crack therein;
    the tube at the inlet end being stepped, as several adjacent generally cylindrical axially extended land areas of progressively smaller inner diameters in moving downstream toward the outlet end;
    the tube inner diameter land areas being sized both in diameter and axial length to correspond to certain more common generally cylindrical outer diameter land areas of conventional available material mixing/dispensing tubes proximate the outlet nozzles thereof, operable when at least one set of the respective land areas from the tube and mixing/dispensing tubes are snugged together to establish a leakproof separable joint between the material mixing/dispensing tube and the port device; and
    a ball and means holding the ball captive in the tube throughbore while allowing free axial movement between opposite operative positions; and said tube having an annular seat defining part of the tube throughbore, whereby axial ball movement against the seat defines one operative position effectively closing the tube throughbore and precluding material backflow, and said tube throughbore being open with said ball in the opposite operative position.

9. A port device according to the combination of claim 8, further wherein the means allowing free axial ball movement between opposite operative positions comprising axially extended guide rails in the bore tube sized to support the ball with material flow clearance between the ball and tube, the bore being open for material flow when the ball is not in the one operative position against the annular seat.

10. A port device according to the combination of claim 8 further comprising the combination of a closure cap having a gripping flange and axially extended first and second nose sections respectively having land areas of smaller outer diameter projected therefrom, the first nose section being smaller than the tube inner diameter land areas and sufficiently long to fit freely therewithin and unseat the ball from against the seat for opening the throughbore before the cap closes the throughbore, and the second nose section having land area generally cylindrical and corresponding in outer diameter to at least one of the tube inner diameter land areas to be snugged cooperatively together to establish with the cap a leakproof separable closure for the port device.

11. A port device for funneling material into a surface crack, comprising the combination of
- a tube having a throughbore between its inlet and outlet ends, and a base at the outlet end suited to be bonded by adhesive to the surface with the tube bore aligned over the crack therein;
- the tube at the inlet end being stepped, as several adjacent generally cylindrical axially extended land areas of progressively smaller inner diameters in moving downstream toward the outlet end;
- the tube land areas being sized both in diameter and axial length to correspond to certain more common generally cylindrical land areas of conventional available material mixing/dispensing tubes proximate the outlet nozzles thereof, operable when at least one set of the respective land areas from the tube and mixing/dispensing tubes are snugged together to establish a leakproof separable joint between the material dispensing tube and the port device;
- the base having a slot formed therein terminating only slightly spaced from a circumferential edge of the base, thereby defining a base segment section connected to the base by thin webs, suited to be folded from the remaining base and allow the base to be positioned closer to a nearby structure with one now exposed slot edge against it, while alternatively when the segment is left flat of having adhesive between the base and surface squeezed through the slot to overlap the base and thereby increase the holding securement between the port device and surface.

12. A port device according to the combination of claim 11, further comprising the combination of check means operable to be shifted between different positions in the tube bore for opening the bore to material flow or closing it to preclude material backflow.

13. A port device according to the combination of claim 12, further comprising the combination of a closure cap having a gripping flange and axially extended first and second nose sections respectively having land areas of smaller outer diameter projected therefrom, the first nose section land area being smaller than the tube inner diameter land areas and sufficiently long to fit freely therewithin and unseat the check means for opening the throughbore before the cap closes the throughbore, and the second nose section land area being generally cylindrical and corresponding to at least one of the tube inner diameter land areas to be snugged cooperatively together to establish with the cap a leakproof separable closure for the port device.

14. A port device according to the combination of claim 11, further wherein the means allowing free axial ball movement between opposite operative positions comprising axially extended guide rails in the tube throughbore sized to support the ball with material flow clearance between the ball and tube, the throughbore being open for material flow when the ball is not in the one operative position against the annular seat.

15. A port device according to the combination of claim 11, further comprising the combination of a closure cap having a gripping flange and axially extended first and second nose sections of smaller O.D. projected therefrom, the first nose section being smaller than the tube to fit freely therewithin and unseat the check means for opening the throughbore before the cap closes the throughbore, and the second nose section corresponding to at least one of the tube inner diameter land areas to be snugged cooperatively together to establish with the cap a generally leakproof separable closure for the port device.

16. A port device for funneling material into a surface crack, comprising the combination of
- a tube having a throughbore between its inlet and outlet ends, and a base at the outlet end suited to be bonded by adhesive to the surface with the tube throughbore aligned over the crack therein;
- the base having a slot formed therein terminating only slightly spaced from a circumferential edge of the base, thereby defining a base segment section connected to the base by thin webs, suited to be folded from the remaining base and allow the base to be positioned closer to a nearby structure with the slot edge against it, while alternatively when the segment is left flat of having adhesive between the base and surface squeezed through the slot to overlap the base and thereby increase the holding securement between the port device and surface; and
- the tube at the inlet end being sized both in diameter and axial length to cooperate with conventional available material mixing/dispensing tubes proximate the outlet nozzles thereof, operable to establish a generally leakproof separable joint between the material dispensing tube and the port device.

17. A port device for funneling material into a surface crack, comprising the combination of
- a tube having a throughbore between its inlet and outlet ends, and a base at the outlet end suited to be bonded by adhesive to the surface with the tube bore aligned over the therein;
- the tube at the inlet end being sized both in diameter and axial length to cooperate with conventional available material mixing/dispensing tubes proximate the outlet nozzles thereof, operable to establish a generally leakproof separable joint between the material dispensing tube and the port device; and check means operable to be shifted between different positions in the tube throughbore for opening the throughbore to material flow or closing it to preclude material backflow, the check means comprising the combination of a ball and means holding the ball captive in the tube throughbore while allowing free axial movement between opposite operative positions, said tube having an annular seat defining part of the tube throughbore, whereby axial ball movement against the seat defines one operative position effectively closing the tube throughbore and precluding material backflow, and said tube throughbore being open with said ball in the opposite operative position.

18. A port device according to the combination of claim 17, further comprising the ball being formed of a metal such as steel to generally have a unit density greater than the material being dispensed, thereby tending to sink and not float when submerged therein.

* * * * *